(12) United States Patent
Park et al.

(10) Patent No.: US 6,279,407 B1
(45) Date of Patent: *Aug. 28, 2001

(54) LINKAGE WITH CAPACITIVE FORCE SENSOR ASSEMBLY

(75) Inventors: Kyong M. Park, Thousand Oaks; Marcos A. Nassar, Los Angeles, both of CA (US)

(73) Assignee: Kavlico Corporation, Moorpark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,431

(22) Filed: Apr. 25, 2000

(51) Int. Cl.[7] ................................. G01L 1/26; G01L 5/04
(52) U.S. Cl. ........................................................ 73/862.391
(58) Field of Search .............................. 73/856, 774, 831, 73/866, 862.381, 862.391

(56) References Cited

U.S. PATENT DOCUMENTS 4,510,802 * 4/1985 Peters ..................................... 73/505
6,178,829 * 1/2001 Ferguson ......................... 73/862.391

* cited by examiner

Primary Examiner—Benjamin R. Fuller
Assistant Examiner—Octavia Davis
(74) Attorney, Agent, or Firm—Oppenheimer Wolff & Donnelly LLP

(57) ABSTRACT

A combined mechanical linkage and force-measuring assembly includes a central capacitive force sensor, in which force applied to the sensor causes the flexing of a diaphragm toward and away from a substrate, and a change in the capacitance between two conductive surfaces on the diaphragm and the substrate is sensed and processed to indicate the direction and magnitude of the force applied to the linkage. The linkage may have two parts coupled together by a flange which flexes under applied forces, to change the spacing of the conductive surfaces.

20 Claims, 2 Drawing Sheets

US 6,279,407 B1

LINKAGE WITH CAPACITIVE FORCE SENSOR ASSEMBLY

FIELD OF THE INVENTION

This invention relates to mechanical linkages with arrangements for sensing the amount of force applied to said linkage.

BACKGROUND OF THE INVENTION

Various systems for measuring the force applied to mechanical linkages have been proposed. However, by and large, the previously proposed linkage and sensor assemblies have not been sufficiently accurate and reliable, and/or have compromised the structural integrity of the linkage. Particularly for aircraft applications, the shortcomings noted above may become critical.

SUMMARY OF THE INVENTION

In accordance with one illustrative embodiment of the invention, a mechanical linkage includes first and second linkage members extending respectively from first and second external coupling points to an intermediate sub-assembly including a capacitive force measuring transducer. The first linkage member has a shaft extending from said first coupling point to said sub-assembly, and has a peripheral flange extending outwardly from said shaft at said sub-assembly; and the second linkage member has an inner opening or bore making a close sliding fit with the shaft of said first linkage member, and has an outer portion firmly secured to said peripheral flange, so that the first linkage member can move linearly toward and away from the second linkage member in accordance with the resilience of said flange. The sub-assembly also includes capacitive sensing arrangements for sensing the displacement of said shaft as said flange deflects or flexes as force is applied to the overall linkage.

The capacitive sensing arrangements preferably include a ceramic diaphragm mounted to flex with shaft position shifts, and a ceramic substrate fixed to the second linkage and spaced from the ceramic diaphragm, with conductive layers on the ceramic diaphragm and substrate to form a variable capacitor, the capacitance of which indicates the magnitude of the applied force to the overall linkage.

More generally, the capacitive sensing arrangements of the mechanical linkage described above include a pair of spaced conductive surfaces which form a capacitor, and wherein the relative movement of the first and second linkages and the flexing of the flange changes the spacing of the spaced conductive surfaces.

As a desirable advantage, the linkage assembly of the present invention does not change in length to any significant extent with changes in applied force, as the capacitive sensors are very sensitive to relatively small changes in the spacing of the capacitive plates.

Other objects, features and advantages of the invention will become apparent from a consideration of the following detailed description and from the accompanying drawings.

BRIEF DESCRIPTION OF THE DRAWINGS

FIG. 3 is a cross-sectional view of another embodiment of the invention.

DETAILED DESCRIPTION OF PREFERRED EMBODIMENTS

Figure 1:
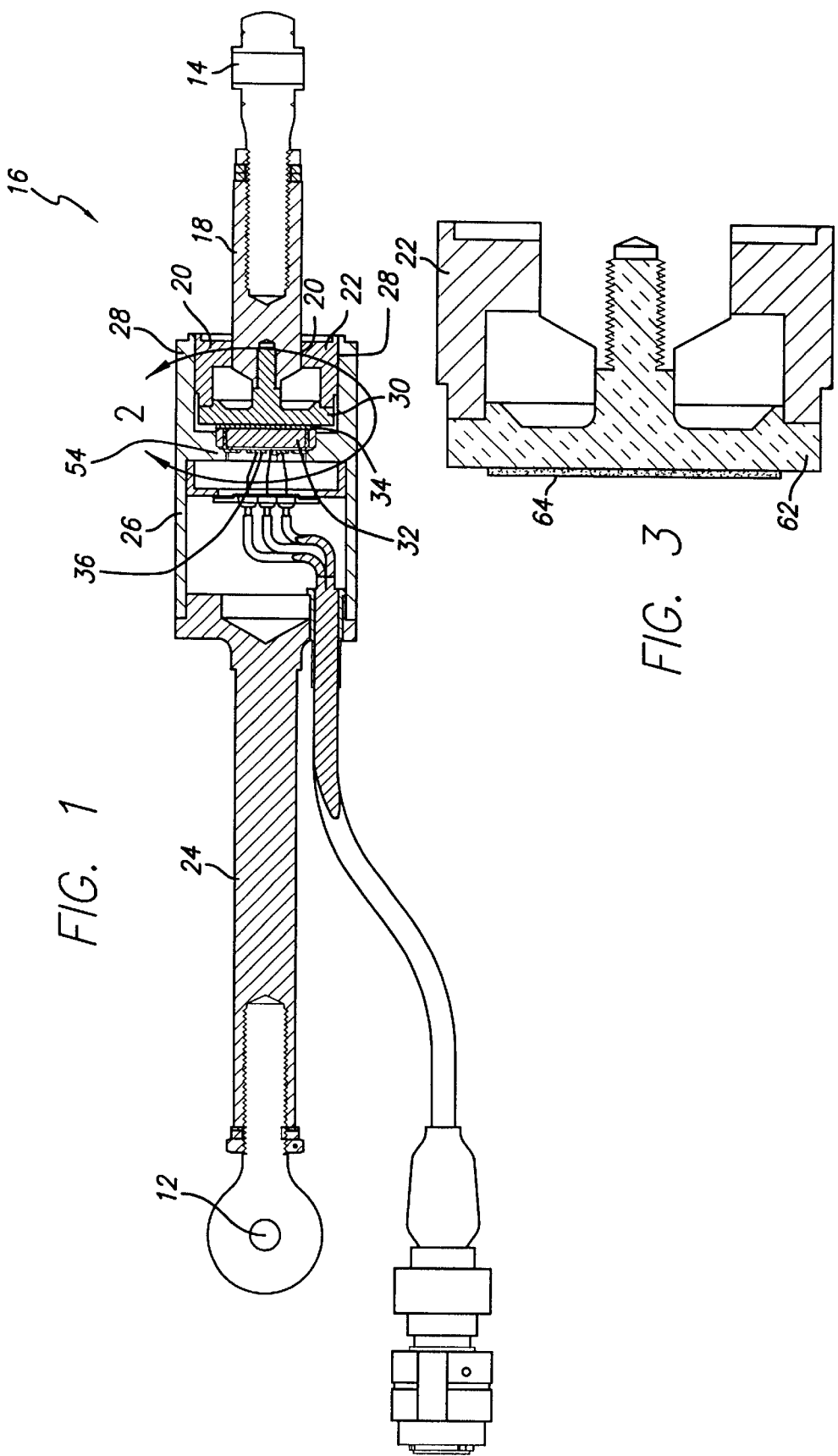
FIG. 1 is an overall view of a linkage assembly, illustrating the principles of the present invention.
Figure 2:
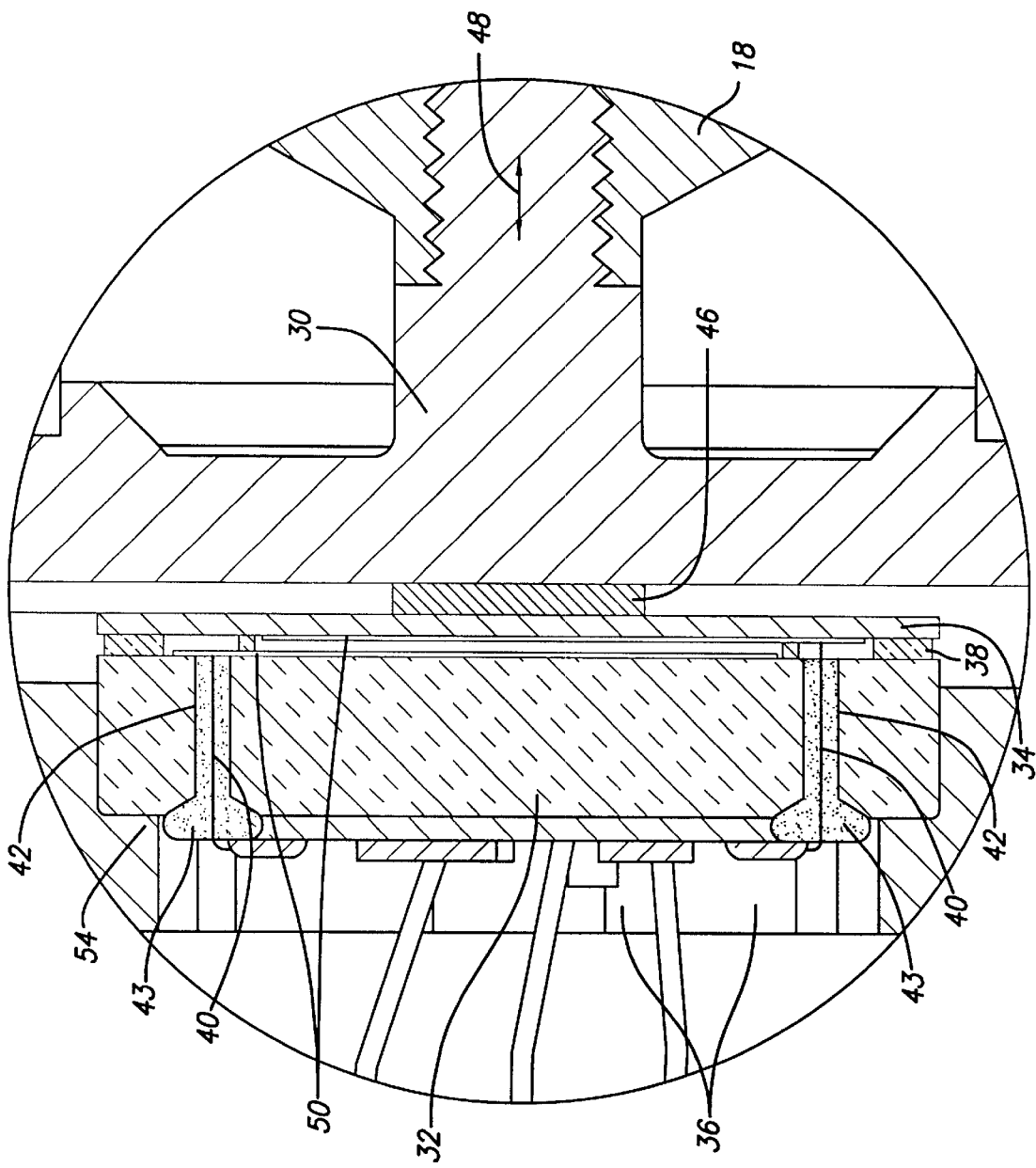
FIG. 2 is an enlarged view of a central sensing portion of the assembly of FIG. 1.

Referring more particularly to the drawings, FIG. 1 shows a combined mechanical linkage and force measurement assembly. More particularly, the mechanical linkage of FIG. 1 has first and second mechanical coupling points 12 and 14, and an intermediate force-measuring assembly 16. Incidentally, FIG. 2 shows the central portion of the force-measuring assembly in greater detail.

Returning to FIG. 1, the shaft 18 makes a sliding fit in the cylindrical bore 20 as it is coupled to the circular part 22.

The other end of the overall linkage includes the shaft 24 and the outer housing member 26. The outer housing 26 is bonded or welded at the cylindrical area 28 to the circular member 22. Secured to the shaft 18 and to the member 22 is the circular metallic member 30, which flexes when force is applied to the overall linkage at the coupling points 12 and 14.

A capacitive sensor, including a substrate 32 and a diaphragm 34, forms the central sensing element for indicating the force between the coupling points 12 and 14. Mounted on the rear of the substrate 32 is a semiconductor circuit 36, which senses the changes in capacitance of the unit, including the diaphragm 34 and the substrate 32, and provides a variable voltage which indicates this change in capacitance, and, of course, the force applied between the two coupling points 12 and 14 of the linkage. The diaphragm 34 is spaced apart from the substrate 32 by a relatively small distance, such as about 0.0005 to 0.020 of an inch, and is bonded and spaced from the substrate by the outer peripheral ring of glass frit 38. On the facing surfaces of the diaphragm 34 and the substrate 32 are thin layers 50 of conductive material, such as gold, and these may be protected against engagement by a very thin layer of insulating material, such as glass, over at least one of the layers.

Leads 40 interconnect the conductive layers 50 to the circuit 36 through the bores 42 and are sealed within these bores by epoxy 43.

Reference is made to several additional patents owned by the assignee of the present invention, and these include U.S. Pat. Nos. 4,388,668, 4,398,426 and 5,329,819, the disclosures of which are incorporated into this specification by reference.

In practice, as discussed above, when force is applied between the coupling points 12 and 14 of the overall linkage, the outwardly-extending part 30, with its peripheral flange, is flexed somewhat, either inwardly or outwardly, depending on the direction of the force applied to the coupling points. The center of the part 30 is bonded to the center of the diaphragm 34 by epoxy 46, so that as the center of the part 30 moves in or out, as indicated by the arrow 48, the diaphragm 34 will be flexed inwardly or outwardly, to increase or decrease the capacitance between the two conductive plates 50 on the surfaces of the diaphragm 34 and the substrate 32.

It may be noted that the assembly including the substrate 32 and the diaphragm 34 are held in position with the diaphragm adjacent the part 30, by the shoulder 54 on the part 26.

FIG. 3 shows an alternative embodiment in which a ceramic member 62 replaces the member 30, as shown in FIGS. 1 and 2 of the drawings. On the exposed surface of the ceramic member 62 is a conductive layer 64. In the arrangement as shown in FIG. 3, the diaphragm 34 may be dispensed with, and the part 62 may be directly bonded to and spaced from the substrate 32 by means of a peripheral layer of glass frit, as discussed above in connection with FIG. 2 of the drawings. Accordingly, the part 62 acts as the diaphragm, and the separate diaphragm may be dispensed with.

As a further, less preferred embodiment, the metal member 30 may serve as the diaphragm in an arrangement similar to that shown in FIG. 2, but with the diaphragm 34 omitted.

It may be particularly noted that in FIG. 2, the spacing between the conductive plates 50, the thickness of the diaphragm 34 and the thickness of the bonding epoxy 46 are all exaggerated for clarity of disclosure, but would actually be much thinner than indicated in FIG. 2.

As mentioned above, the spacing between the conductive plates on the diaphragm 34 and the substrate 32 is fairly small, preferably in the order of one-half of one thousandth of an inch to about twenty thousandths of an inch. Further, the thickness of the outwardly extending part is designed to flex so that the desired level of forces to be measured matches the spacing of the two conductive plates. With this configuration the assembly has the desired result that the length between the two coupling points changes very little with variable applied forces.

In closing, it is to be understood that the foregoing detailed description and the accompanying drawings relate to specific preferred illustrative embodiments of the invention. Various changes and alternative constructions may be implied without departing from the spirit and scope of the invention. Thus, by way of example, the diaphragm and the substrate are preferably made of alumina, but other ceramic or other insulating materials may be employed. Similarly, while the part 30 is shown as a somewhat mushroom-shaped part, it could be more of a spider construction with several individual arms extending outwardly and would still flex and produce the desired central movement to actuate the diaphragm 34. It is also to be understood that other types of linkages, shorter, or longer, or with different types of coupling points could be employed. Accordingly, the present invention is not limited to the embodiments shown in the drawings and described in detail herein.

What is claimed is:

1. A combined mechanical linkage and force measurement assembly, comprising:

a first linkage member having a first coupling point;

a second linkage member having a second coupling point;

an intermediate coupling subassembly between said first and second linkage members, said subassembly including a force measurement transducer;

said first linkage member having a generally mushroom shaped end at said coupling sub-assembly, with a shaft extending from said first coupling point to said subassembly, and a peripheral flange extending outwardly from said shaft;

said second linkage member having an inner opening or bore making a close sliding fit with said shaft, and an outer portion secured to said peripheral flange, whereby said shaft can move linearly toward and away from said second linkage member in accordance with said outwardly extending flange, said flange being resilient to permit the linear movement of said shaft in said bore;

a capacitive transducer having a diaphragm mechanically coupled to said shaft to flex as said shaft shifts position, said diaphragm having a conductive layer thereon, in facing juxtaposition to a fixed conductive surface; and electrical circuitry for measuring a change in capacitance between said conductive layer and said conductive surface to thereby indicate the force being applied to said linkage assembly between said first and second coupling points.

2. A combined mechanical linkage and force measurement assembly as defined in claim 1 wherein said opening or bore is cylindrical, and said shaft makes a close sliding fit within said bore.

3. A combined mechanical linkage and force measurement assembly as defined in claim 1 wherein said second linkage member has a generally circular outer portion firmly secured to said peripheral flange.

4. A combined mechanical linkage and force measurement assembly as defined in claim 1 wherein said diaphragm is formed of ceramic material.

5. A combined mechanical linkage and force measurement assembly as defined in claim 1 wherein said diaphragm, having a center, is bonded to said first linkage member at said center of said diaphragm.

6. A combined mechanical linkage and force measurement assembly, comprising:

a first linkage member having a first coupling point;

a second linkage member having a second coupling point;

an intermediate coupling subassembly between said first and second linkage members, said subassembly including a force measurement transducer;

said first linkage member having a shaft extending from said first coupling point to said subassembly, and a peripheral flange extending outwardly from said shaft at said subassembly;

said second linkage member having an inner opening or bore making a close sliding fit with said shaft, and an outer portion secured to said peripheral flange, whereby said shaft can move linearly toward and away from said second linkage member in accordance with said outwardly extending flange, said flange being resilient and flexing to permit the linear movement of said shaft in said bore;

a capacitive transducer having two spaced conductive surfaces, with the spacing of said surfaces varying with the relative movement of said two linkage members and the flexing of said flange; and electrical circuitry for measuring a change in capacitance between said conductive surfaces to thereby indicate the force being applied to said linkage assembly between said first and second coupling points.

7. A combined mechanical linkage and force measurement assembly as defined in claim 6 wherein said opening or bore is cylindrical, and said shaft makes a close sliding fit within said bore.

8. A combined mechanical linkage and force measurement assembly as defined in claim 6 wherein said second linkage member is firmly secured to said peripheral flange.

9. A combined mechanical linkage and force measurement assembly as defined in claim 6 wherein one of said conductive surfaces is mounted on a diaphragm formed of ceramic material.

10. A combined mechanical linkage and force measurement assembly as defined in claim 6 wherein said capacitive transducer includes a thin diaphragm and a relatively thick substrate secured together and spaced apart by between 0.0005 inch and 0.020 inch, said diaphragm and substrate being formed of ceramic material and having facing surfaces and also having conductive layers on said diaphragm's and said substrate's facing surfaces.

11. A combined mechanical linkage and force measurement assembly, comprising:

a first linkage member having a first coupling;

a second linkage member having a second coupling;

an intermediate coupling subassembly between said first and second linkage members, said subassembly including a force measurement transducer;

said first linkage member having a shaft extending from said first coupling point to said subassembly, said linkage member having at least a portion thereof being resilient and extending outwardly from said shaft at said sub-assembly;

said second linkage member making a guiding fit with said shaft, and having an outer portion secured to said outwardly extending portion of said first linkage member, whereby said shaft can move toward and away from said second linkage member in accordance with the resilience of said outwardly extending portion of said first linkage; and a capacitive transducer included in said subassembly, said transducer having two spaced conductive surfaces, with the spacing of said surfaces varying with the movement of said two linkage members and the resilience of said outwardly extending portion of said first linkage member.

12. A combined mechanical linkage and force measurement assembly as defined in claim 11, further comprising electrical circuitry for measuring a change in capacitance between said conductive surfaces to thereby indicate the force being applied to said linkage assembly between said first and second coupling points.

13. A combined mechanical linkage and force measurement assembly as defined in claim 11 wherein said guiding fit utilizes a cylindrical opening or bore, and said shaft makes a close sliding fit within said bore.

14. A combined mechanical linkage and force measurement assembly as defined in claim 6 wherein said second linkage member is firmly secured to said outwardly extending portion of said first linkage member.

15. A combined mechanical linkage and force measurement assembly as defined in claim 11 wherein one of said conductive surfaces is mounted on a diaphragm formed of ceramic material.

16. A combined mechanical linkage and force measurement assembly as defined in claim 15 wherein said diaphragm, having a center, is bonded to said first linkage member at said center of said diaphragm.

17. A combined mechanical linkage and force measurement assembly as defined in claim 11 wherein said capacitive transducer includes a thin diaphragm and a relatively thick substrate secured together and spaced apart by between 0.0005 inch and 0.020 inch, said diaphragm and substrate being formed of ceramic material and having facing surfaces and also having conductive layers on said diaphragm's and said substrate's facing surfaces.

18. A combined mechanical linkage and force measurement assembly as defined in claim 11 wherein said outwardly extending portion forms a peripheral flange.

19. A combined mechanical linkage and force measurement assembly as defined in claim 11 wherein a portion of said first linkage is formed of ceramic material having a conductive coating thereon forming part of said force measurement transducer.

20. A combined mechanical linkage and force measurement assembly as defined in claim 11 wherein said two linkage members are secured together by high strength metal-to-metal mechanical connections to maintain high overall mechanical strength of said combined mechanical linkage and force measurement assembly under high stress conditions.

* * * * *